United States Patent
Jenkner et al.

(10) Patent No.: US 6,363,749 B1
(45) Date of Patent: Apr. 2, 2002

(54) PROCESS FOR MANUFACTURING SURFACE-SEALED HOLLOW GLASS CONTAINERS

(75) Inventors: Peter Jenkner, Rheinfelden; Rainer Lomölder, Münster; Peter Speier, Marl; Elmar Stäbler, Bad Wurzach; Alois Fickler, Pfaffenhausen; Gerd Buchmayer, Bad Wurzach, all of (DE)

(73) Assignees: Degussa AG, Duesseldorf; Oberland Glas AG, Bad Wurzach, both of (DE)

(*) Notice: Subject to any disclaimer, the term of this patent is extended or adjusted under 35 U.S.C. 154(b) by 0 days.

(21) Appl. No.: 09/147,336

(22) PCT Filed: Mar. 28, 1998

(86) PCT No.: PCT/EP98/01841
§ 371 Date: Mar. 31, 1999
§ 102(e) Date: Mar. 31, 1999

(87) PCT Pub. No.: WO98/45216
PCT Pub. Date: Oct. 15, 1998

(30) Foreign Application Priority Data

Apr. 3, 1998 (DE) .......................................... 198 09 057

(51) Int. Cl.⁷ ............................................... C03C 17/30
(52) U.S. Cl. ............................ 65/60.3; 65/28; 106/243; 106/244; 106/271; 106/287.11; 106/287.13; 106/287.14; 106/287.15; 106/287.16; 428/34.1; 428/34.4; 428/34.7
(58) Field of Search ................................ 106/243, 244, 106/271, 287.11, 287.13, 287.14, 287.15, 287.16; 65/28, 60.2, 60.3; 428/34.1, 34.4, 34.7

(56) References Cited

U.S. PATENT DOCUMENTS

| 3,438,801 A | 4/1969 | Schlientz et al. |
|---|---|---|
| 3,801,361 A | 4/1974 | Kitaj |
| 3,873,352 A | 3/1975 | Kitaj |
| 4,130,677 A | 12/1978 | Huntsberger |
| 4,154,638 A * | 5/1979 | Franz et al. ................. 156/326 |
| 4,304,802 A | 12/1981 | Mosse et al. |
| 4,374,879 A | 2/1983 | Roberts et al. |
| 4,985,286 A | 1/1991 | Kurita et al. |
| 5,567,235 A | 10/1996 | Carson et al. |
| 5,866,262 A * | 2/1999 | Galic et al. ................. 428/447 |
| 6,096,394 A * | 8/2000 | Jenkner et al. ............ 428/34.7 |

FOREIGN PATENT DOCUMENTS

| DE | 1 291 448 | 5/1973 |
|---|---|---|
| DE | 31 44 457 | 6/1982 |
| DE | 44 43 824 | 6/1996 |
| DE | 44 43 825 | 6/1996 |
| EP | 0 146 142 | 6/1985 |
| EP | 0 437 902 | 7/1991 |
| EP | 0 478 154 | 4/1992 |
| GB | 2 021 124 | 11/1979 |
| WO | WO 95/00259 | 1/1995 |
| WO | WO 97/47563 | 12/1997 |

OTHER PUBLICATIONS

Patent Abstracts of Japan, vol. 7, No. 22 (C–148), Jan. 28, 1983, JP 57 179053, Nov. 04, 1982.

* cited by examiner

*Primary Examiner*—Sean Vincent
(74) *Attorney, Agent, or Firm*—Oblon, Spivak, McClelland, Maier & Neustadt, P.C.

(57) ABSTRACT

A process for producing surface-sealed hollow glass containers, wherein as part of the production process the hollow glass containers are coated with a water-based cold end coating composition in the region of the exit from the annealing lehr, which is arranged following a machine for producing hollow glass containers, where the cold end coating composition comprises the following components: I. a water-based organopolysiloxane-containing composition prepared from alkoxysilanes which carry a functional group and alkoxysilanes which are selected from trialkoxysilanes, dialkoxysilanes and tetraalkoxysilanes, and II. a silicon-free component selected from a wax, a partial fatty acid ester, a fatty acid and/or a surfactant. The hollow glass containers produced in this way feature an enhanced long-term service strength.

23 Claims, No Drawings

PROCESS FOR MANUFACTURING SURFACE-SEALED HOLLOW GLASS CONTAINERS

The invention relates to a process for producing surface-sealed hollow glass containers with the aid of a special cold end coating composition.

In the preparation process for hollow glass containers it is conventional to subject them to a surface treatment with which it is intended to cover external damage such as microcracks, and to minimize further damage. Thus immediately downstream of the production machine the so-called hot end coating is applied as a thin coat to the surface of the glass which is at from 500 to 550° C. The compounds involved in this hot end coating are, in particular, chlorides of titanium and of tin. On the glass surfaces these compounds produce a titanium or tin dioxide layer, with the chlorine released passing into the waste gas. The hot end coating composition is applied by vaporization or spray atomization.

After hot end coating, the hollow glass containers pass through an annealing lehr in which they are cooled slowly in order to avoid harmful stresses.

At the discharge end of the annealing lehr, the hollow glass containers hot end coated beforehand are cold end coated by means of either vaporization or spray atomization. This produces the lubricity required for the remainder of the process in the glass plant and in the bottling plant.

The most common substances used as cold end coating agents are surfactants, fatty acid products, partial fatty acid esters, ester wax emulsions and various polyethylene dispersions.

A coating process in which hot end coating is carried out first and then a cold end coating composition comprising an olefin polymer, a polyurethane, a polystyrene or an alkylamine acetate is applied by spraying is known from DE-C 12 91 448. The bottles coated in this way, however, do not satisfy all requirements.

A certain degree of improvement in the scratch resistance is obtained if the polyethylene dispersion sprayed on as the cold end coating composition additionally comprises a silane (U.S. Pat. Nos. 3,438,801, 3,801,361, 3,873,352, 4,130,677, 4,374,879; EP-A-0 146 142). However, the level of properties is still not sufficient for all applications.

A further development. of the prior art was to apply by spraying, as the cold end coating, first the solution or dispersion of a silane and then a further component such as, for example, a polyethylene dispersion. Reference is made here to U.S. Pat. Nos. 3,438,801, 4,130,677, 4,304,802, 5,567,235 (corresponding to WO-A-95/00259) and to EP-A-0 146 142 and EP-A-0 478 154.

It is known, furthermore, that cold end coating can also be carried out with a polysiloxane (U.S. Pat. No. 4,985,286; DE-A-31 44 457).

The coatings described do indeed ensure a good basic strength of the glass containers; however, this strength falls rapidly in the subsequent production process and in the subsequent use of the containers. Causes of this loss in strength are microscopic damage, which occurs unavoidably during shaping and during the subsequent transportation of the glass containers while being hot and which may act as a potential source of fracture depending on the level and situation of the damage and on the stress experienced by the containers.

One object of the present invention is to render such microscopic damage harmless actually in the course of the production process.

A further object is to render the hollow articles less sensitive to mechanical effects acting on the surface in the course of subsequent handling, i.e. on the conveyor belt and in the course of packaging, dispatch and filling.

Another important aspect is that the hollow articles should have an improved durability in long-term use relative to the prior art. Thus, in particular, reusable bottles for carbonated drinks should still have a sufficiently high strength and, in particular, internal pressure resistance even after many returns.

In addition, the hollow glass containers should have improved chemical resistance, especially with respect to water and washing liquors.

It is the intention, furthermore, that the dry and wet scratch resistance should be increased and so the nick scratch properties improved.

Overall, the intention is to improve the mechanical properties relative to the prior art in such a way that it is possible to reduce the weight of the container with no change in strength.

The mechanical properties are also to be improved relative to the prior art such that hot end coating can be omitted with no change in final strength.

It should be possible, relative to the customarily performed coating, to achieve improved labeling, even with conventional glues.

These improvements are intended to be obtained with an extremely simple process which can be carried out on conventional production lines without significant additional investment. The intention in this context is, in particular, to avoid the need for a curing step, since that would imply greater investment and process costs.

Overall, the effect in accordance with the invention should ensue directly after the process measure has been carried out, i.e. without a significant waiting period, so that the protective effect occurs without delay in the course of subsequent further transportation on the belt.

To achieve these objects the invention proposes a process for producing surface-sealed hollow glass containers, where as part of the production process the hollow glass containers are coated with a water-based cold end coating composition in the region of the exit from the annealing lehr, which is arranged following a machine for producing hollow glass containers, wherein the cold end coating composition comprises the following components:

I. a water-based organopolysiloxane-containing composition prepared from a) Q moles of functional group-bearing alkoxysilanes of the general formula $$A\text{—}Si(R^1)_y(OR^*)_{3-y} \qquad \qquad I$$

and b) M moles of alkoxysilanes selected from
α) trialkoxysilanes of the general formula $$R^2\text{—}Si(OR^{**})_3 \qquad \qquad II$$

and/or
β) dialkoxysilanes of the general formula $$R^3R^4Si(OR^{***})_2 \qquad \qquad III$$

and/or
γ) tetraalkoxysilanes of the general formula $$Si(OR^{***})_4 \qquad \qquad IV,$$

where
A is a substituent possessing at least one amino, alkylamino, dialkylamino, amido, epoxy, acryloxy, methacryloxy, cyano, isocyanato, ureido, thiocyanato, mercapto, sulfane or halogen group which is attached directly or via an aliphatic or aromatic hydrocarbon radical to silicon, $R^1$=methyl, ethyl or A (as defined above), y=0 or 1, R*, R, R* and R**** independently of one another are an alkyl group having 1 to 8 carbon atoms or a corresponding alkyl group that is substituted by an alkyl[(poly) ethylene glycol] radical, $R^2$, R3 and $R^4$ independently of one another are an alkyl, alkenyl, alkynyl, cycloalkyl, cycloalkenyl or aromatic group having in each case not more than 18 carbon atoms, or a group of this kind which is partially fluorinated, perfluorinated and/or substituted by alkyloxy and/or by aryloxy groups, in a molar ratio $0 \leq M/Q \leq 20$, and II. a silicon-free component selected from
  a) a wax and/or
  b) a partial fatty acid ester and/or
  c) a fatty acid and/or
  d) a surfactant;

and additionally wherein the water-based cold end coating composition has a dry-matter content of from 0.1 to 10% by weight and, based on dry matter, the weight ratio of the organopolysiloxane-containing composition I to the silicon-free component II is from 0.05:1 to 20:1.

The invention also provides, moreover, the hollow glass containers produced by this process.

Hollow glass containers for the purposes of this invention are, in principle, any type of glass packaging, examples being bottles, preserve jars, ampules, tablet tubes or flasks.

In the region of the entrance of the annealing lehr it is possible if desired to apply a conventional hot end coating composition by any technique of the prior art to the surfaces of the freshly produced hollow glass containers. In view, however, of the massive increase in service strength achieved in accordance with the invention it is possible to omit hot end coating, which is not only more cost-effective but also, by reducing the emissions, offers an ecological advantage. Furthermore, if hot end coating is dropped, a further result is improved conditions as a result of additional freedom in the production of glass containers, such as extending the machine belt cooling and the lateral cooling, better access, the possibility of installing hot end inspection machines, etc.

The functional group-bearing alkoxysilane of the general formula $$A\text{---}Si(R^1)_y(OR^*)_{3-y} \qquad \text{I}$$

can be selected, for example, from the following compounds:

3-aminopropyltrimethoxysilane,
3-aminopropyltriethoxysilane, 3-pyrrolidinopropyltrimethoxysilane, N-methyl-3-aminopropyltrimethoxysilane,
3-aminopropylmethyldiethoxysilane, N-aminoethyl-3-aminopropyltrimethoxysilane, N-(benzylaminoethyl)-3-aminopropyltrimethoxysilane,
p-anilinotriethoxysilane,
4-aminobutylmethyldiethoxysilane, $(CH_3O)_3Si$—$C_3H_6$—NH—$C_2H_4$—NH—$C_2H_4$—$NH_2$,

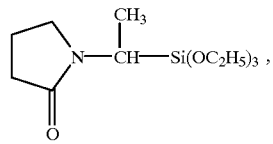

3-glycidyloxypropyltrimethoxysilane,

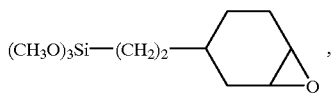

$CH_2$=$C(CH_3)$—COO—$C_3H_6$—$Si(OCH_3)_3$,
$CH_2$=CH—COO—$C_3H_6$—$Si(OC_2H_5)_3$,
3-cyanopropyltrimethoxysilane,
3-cyanopropyltriethoxysilane,
3-isocyanatopropyltriethoxysilane,
ureidopropyltrimethoxysilane,
3-thiocyanatopropyltrimethoxysilane,
3-mercaptopropyltrimethoxysilane,
3-mercaptopropyltriethoxysilane,
3-mercaptopropylmethyldimethoxysilane,
4-mercaptobutyltrimethoxysilane,
6-mercaptohexyltrimethoxysilane,
3-chloropropyltrimethoxysilane and $(C_2H_5O)_3Si$ $(CH_2)_3$—$S_4$—$(CH_2)_3Si(OC_2H_5)_3$.

Examples of compounds suitable as the trialkoxysilane of the general formula $$R^2\text{---}Si(OR^{**})_3 \qquad \text{II}$$

are the following:

methyltrimethoxysilane, methyltriethoxysilane, ethyltrimethoxysilane, ethyltriethoxysilane, n-propyltriethoxysilane, n-butyltrimethoxysilane, i-butyltrimethoxysilane, octyltriethoxysilane, hexadecyltrimethoxysilane, stearyltrimethoxysilane, cyclohexyltrimethoxysilane, cyclohexenylethyltriethoxysilane, phenyltrimethoxysilane, phenyltriethoxysilane, vinyltrimethoxysilane, vinyltriethoxysilane, vinyltri(2-methoxyethoxy)silane, allyltrimethoxysilane, allyltriethoxysilane, $CF_3CH_2CH_2$—$Si(OCH_3)_3$, $CF_3CH_2CH_2$—$Si(OC_2H_5)_3$, $C_2F_5CH_2CH_2$—$Si(OCH_3)_3$, $C_4F_9CH_2CH_2$—$Si(OCH_3)_3$, n-$C_6F_{13}CH_2CH_2$—$Si(OC_2H_5)_3$, n-$C_8F_{17}CH_2CH_2$—$Si(OCH_3)_3$ and n-$C_{10}F_{21}CH_2CH_2$—$Si(OCH_3)_3$.

Suitable dialkoxysilanes of the general formula $$R^3R^4Si(OR^{***})_2 \qquad \text{III}$$

are, for example, dimethyldimethoxysilane, dimethyldiethoxysilane, diethyldimethoxysilane, methyl-i-butyldiethoxysilane, cyclohexylmethyldimethoxysilane, diphenyldimethoxysilane, diphenyldiethoxysilane, methylphenyldimethoxysilane and $CF_3CH_2CH_2Si(CH_3)(OCH_3)_2$.

Examples of compounds suitable as the tetraalkoxysilane of the general formula $$Si(OR^{****})_4 \qquad \text{IV}$$

are the following:
tetramethoxysilane, tetraethoxysilane, tetra(n-propoxy)silane, tetra(i-propoxy)silane and tetra(n-butoxy)silane.

In the mixture of the silanes I to IV there are on average per silicon atom preferably at least 2.4 alkoxy groups OR*, OR, OR* and/or OR****, with particular preference at least 2.5 alkoxy groups and, with very particular preference, at least 2.6 alkoxy groups. This makes it possible to ensure that the resulting organopolysiloxane-containing compositions are sufficiently soluble in water. Depending, however, on the substituents A and $R^1$ to $R^4$ it is also possible for sufficiently water-soluble systems to be obtained even below the preferred minimum value of 2.4. Here, the skilled worker is able to fall back on his or her experience and to discover suitable systems, if appropriate, by means of simple routine experiments.

The water-based organopolysiloxane-containing composition (component I) can be prepared from the monomers of the formulae I to IV by mixing the silane composition with water and leaving it to stand at room temperature for at least 3 hours. In this case at least 0.5 mol and preferably at least 1 mol of water should be used per mole of the alkoxysilanes employed. It is also possible to add from the start the entire amount of water that is present in the ready-to-use cold end coating composition. During the maturation period, initial condensation takes place to give oligomeric structures. In this context it is readily possible to add the silicon-free component II right at the beginning.

In a preferred embodiment, the mixture of the silane composition with water (and, if appropriate, with component II) is left to stand for at least 4 hours and, with particular preference, for at least 6 hours at room temperature (approximately 20° C.).

At higher or lower temperatures it is necessary to adapt the maturation period appropriately. In doing so it is possible to make use of the rule of thumb that an increase in temperature by 10° C. involves roughly a doubling in the rate of reaction.

Alternatively, the water-based organopolysiloxane-containing composition can be prepared by adding from 0.5 to 30 mol of water per mole of the alkoxysilanes employed to the silane composition in accordance with the general formulae I to IV and removing by distillation the alcohol that is formed in the course of the reaction. Suitable processes, and some of the oligomeric structures formed in the reaction, are disclosed in DE-A 44 43 824 and DE-A 44 43 825, which are expressly included herein by reference.

The resulting composition can be homogeneous or colloidal. In accordance with the invention it is also possible to use an emulsion provided it is stable. The sole fundamental prerequisite which must be met is that no precipitations occur during the period of use.

The ratio of the alkoxysilanes of the formulae II to IV to the functional alkoxysilanes of the formula I is preferably $0 \leq M/Q \leq 12$, with particular preference $0.02 \leq M/Q \leq 7$ and, with very particular preference, $0.1 \leq M/Q \leq 4$.

The silicon-free component (component II) acts as a synergist to achieve particularly high strength values.

The wax used as component II is employed in the form of an aqueous dispersion. It is possible here in principle to use any water-dispersible wax.

Natural waxes and synthetic waxes are equally suitable. As natural waxes it is possible to use both recent waxes, such as beeswax, carnauba wax or candelilla wax, and fossil waxes, such as montan wax or its derivatives or petroleum waxes (both paraffin waxes and microwaxes).

Examples of suitable synthetic waxes are Fischer-Tropsch waxes, polyolefin waxes, such as polyethylene wax, polypropylene wax, polyisobutylene wax, and also ester wax (e.g. stearic esters of ethylene glycol, diethylene glycol, polyethylene glycol, 1,4-butanediol, or glycerol tristearate), amide waxes (e.g. N,N'-distearoylethylenediamine), polyethylene glycol wax and polypropylene glycol wax.

Apolar waxes such as petroleum waxes, Fischer-Tropsch waxes and polyolefin waxes can be employed in oxidized form in order to improve their dispersibility. Wax oxidates of this kind have long been prior art.

It is of course also possible to use mixtures of different waxes.

Regarding more precise details reference may be made to Ullmann's Encyclopedia of Industrial Chemistry, Vol. A 28, pp. 103–163, VCH Verlags-gesellschaft, Weinheim, 1996.

Within the framework of the invention it is preferred to employ a polyethylene wax (referred to below as "polyethylene"). The polyethylene used generally has a number-average molecular weight $M_n$ in the range from 400 to 20,000. It is preferred to employ a polyethylene having an $M_n$ in the range from 500 to 15,000 and is particularly preferred to employ one having an $M_n$ in the range from 1000 to 8000. The polyethylene can be prepared by thermal and, if desired, free-radical degradation of polyethylene of higher molecular weight or else by polymerization of ethylene, either free-radically or by means of a transition metal catalyst.

The polyethylene may to a certain extent feature instances of branching, which in the case of short-chain branching as well may have been induced by the concomitant use of olefinic comonomers such as propene, 1-butene or 1-hexene.

In order to prepare a dispersion suitable for cold end coating it is common to start from partially oxidized polyethylene which may in addition have been esterified and/or saponified. A large number of such polyethylenes are obtainable commercially.

Another possibility is to employ copolymers composed of more than 50 mol-% of ethylene and less than 50 mol-% of a polar monomer, examples being ethylene-vinyl acetate copolymer waxes or copolymers of ethylene and acrylic acid.

Another possibility for preparing dispersible polyethylene is to graft polyethylene in the melt with an unsaturated polar monomer such as maleic anhydride. In this case it is generally sensible to add a free-radical initiator.

From the polyethylene thus modified it is possible by customary methods, with or without further modification, to prepare a nonionic, anionic or cationic dispersion, surfactants normally being added as emulsifiers.

The partial fatty acid ester used as component II can be of any type which is customarily employed for cold end coating. Examples that may be mentioned are glycerol monoacetate, glycerol monostearate, glycerol distearate and mixed partial esters of mannitol with stearic acid and palmitic acid.

Suitable fatty acids used as component II have the structure R—COOH where R is a radical of 10 to 22 carbon atoms and can be straight-chain or branched, saturated or unsaturated. Examples that may be mentioned are oleic acid, stearic acid, palmitic acid and lauric acid.

Surfactants suitable as component II can be anionic, cationic or nonionic. Examples of anionic surfactants used are alkali metal salts or ammonium salts of fatty acids which contain at least about 10 carbon atoms and can be saturated or unsaturated. Particularly suitable ammonium salts in this context are morpholinium salts and also mono-, di- or triethanolammonium salts. Owing to the acceptability under foodstuffs law, the good biodegradability and the good performance properties, potassium oleate is used in particular. Examples of other suitable anionic surfactants are alkali metal salts of the sulfate esters of $C_8$ to $C_{10}$ fatty alcohols, or alkali metal salts of the sulfonic acids of aliphatic $C_{12}$ to $C_{20}$ hydrocarbons.

As cationic surfactants it is possible, for example, to employ compounds of the type $(RNH_3)^+CH_3COO^-$ or $(RNH_3)^{+Cl-}$ where R is a hydrocarbon radical of 8 to 20 carbon atoms. Examples of other suitable ammonium salts are acetates or chlorides of $[RN(CH_3)_3]^+$ or $[R_2N(CH_3)_2]^+$, where R is likewise a $C_8$- to $C_{20}$-alkyl or aralkyl radical.

Examples of nonionic surfactants are polyoxyethylene glycerol fatty acid esters, alkylphenol ethoxylates having 5 to 30, especially 6 to 12 ethylene oxide groups, for example octylphenoxy-polyethoxyethanol, esterification products of fatty acids containing 7 to 22 carbon atoms with polyethylene glycol, for example of stearic acid or oleic acid with PEG-40, adducts of ethylene oxide and $C_8$ to C20 alcohols, or adducts of ethylene oxide with $C_8$- to $C_{20}$-alkylamines.

It is also possible in principle to use any other surfactant not set out herein-above. above. Restrictions consist only insofar as the surfactant should be as unobjectionable as possible from the physiological standpoint and should be to some extent biodegradable.

Of course, component II can also be a mixture of different substances, such as of wax and surfactant, wax, fatty acid and surfactant, partial fatty acid ester and fatty acid, or any other desired combination.

The coating composition used in accordance with the invention is a dilute aqueous system having a dry-matter content of preferably 0.1–8% by weight, more preferably 0.1–6% by weight, with particular preference 0.2–5% by weight and, in particular, 0.5–3% by weight. The aqueous system can if desired contain up to 10% by weight of organic cosolvents, although this is less preferred. The weight ratio of the dry matter of the organopolysiloxane-containing composition (component I) to the silicon-free component II here is from 0.05:1 to 20:1, preferably from 0.05:1 to 5:1 and, with particular preference, from 0.1:1 to 2:1.

It is additionally preferred for the organopolysiloxane-containing composition to be present as dry matter in the ready-to-use coating composition in a proportion of not more than 5% by weight, more preferably not more than 3% by weight, very preferably from 0.03 to 2% by weight, with particular preference from 0.05 to 1% by weight and, with very particular preference, from 0.1 to less than 1% by weight. High amounts of component I not only do not enhance the effect obtained any further but in many cases even impair it. One possible explanation is that component I only develops its action through the interaction with the glass surface and with component II. Larger amounts of component I lead only to the formation of three-dimensionally crosslinked polysiloxane, which is not only superfluous but under certain circumstances is disadvantageous as well. For example, the effect of strength enhancement is lost, or curing is necessary at least; if the concentration of silane is too high, the glass surface may also show slight clouding; moreover, the adhesion of labels is impaired. For the purposes of normal use, concentrations of not more than 0.8% by weight of component I are usually entirely sufficient.

The dry-matter content of the water-based, polysiloxane-containing composition is defined as that solid fraction which remains after storage of a defined amount (approximately 1 g) in a single-use boat for 1 h at 125° C. in a drying cabinet. After the end of the drying operation, for gravimetric analysis the single-use boat is cooled to room temperature in a desiccator for 20 minutes and is back-weighed to a precision of 1 mg on an analytical balance.

The aqueous composition which comprises components I and II can be prepared either in ready-to-use concentration directly or else first as a concentrate which is then diluted with water prior to being used.

One embodiment of this invention comprises the application, to the coat of the cold end coating composition comprising components I and II, of a further coat of a known cold end coating composition which comprises one or more of components II a) to II d), a polyurethane, a polyacrylate, an epoxy resin or precursors thereof. In this way it is possible to obtain particularly high strength values and particularly high resistance to washing liquors.

Especially good results are obtained if the coat applied to the coat of the cold end coating composition comprising components I and II is a further coat of the same type. The result is a more uniform application of the coat, and lower standard deviations of the strength values.

The coat or coats of the cold end coating composition are applied to the surfaces of the hollow glass containers in a customary manner, such as by spraying, dipping or rolling. The cold end coating composition is applied in the temperature range of the glass surfaces of from about 30 to 150° C., preferably from about 70 to 110° C. and, with particular preference, from 80 to 100° C. Within this low range of temperatures, the generation of internal stresses as a result of the cooling that is associated with spraying is minimized. Where two or more coats are applied in succession the coat applied first should be dried, which generally takes from about one to several seconds at the process temperature. Longer waiting periods are unnecessary.

It is fundamentally a significant technic vantage of the process that the applied coat comprising components I and II does not need to be subjected to a curing step, since this would disrupt the course of the process and would entail high investment costs. Moreover, the treated hollow glass containers are protected against mechanical damage immediately after treatment, so that they can be directly transported further without suffering through impact or the pressure of jostling.

The advantages achieved with the process of the invention are associated directly with the morphology of the coat which results from the cold end coating composition. With the aid of analytical methods it is possible, beyond the coat thickness, to define a distribution profile of the different elements (i.e. Si, C, O and, if present, N) which is typical for the process. The hollow glass containers obtained in accordance with the invention therefore differ structurally in this respect from the hollow glass containers of the prior art.

The intention in the text below is to illustrate the invention by way of examples.

EXAMPLE 1

98 parts by weight of water are added to 1.5 parts by weight of a polyethylene dispersion bearing the commercial designation TECOL OG 25 from Trüb Chemie, Ramsen, Switzerland (solids content 25%; anionic emulsifier system). Then 0.5 part by weight of 3-aminopropyltriethoxysilane is incorporated by mixing, after which the mixture is allowed to stand at room temperature for 6 hours and is then ready for use.

EXAMPLE 2

86.4 g of water are metered over the course of 10 minutes into an initial mixture of 265.2 g of 3-aminopropyltriethoxysilane (1.2 mol), 88.8 g of propylmethyidimethoxysilane (0.6 mol) and 98.4 g of propyltrimethoxysilane (0.6 mol). In the course of this addition the temperature rises from 25° C. to 50° C. The reaction mixture is stirred at 60° C. for 2 hours; then 136 g of the resulting hydrolysis alcohol are distilled off at 250 mbar and 45° C. Subsequently, a mixture of 274 g of water and 72.3 g of 84% strength by weight aqueous formic acid is metered in over the course of 15 minutes; in the course of this addition the temperature rises from 45° C. to 55° C. Then an ethanol/methanol/water mixture is distilled off over the course of about 4 hours (200–133 mbar; 50° C.) and at the same time is replaced by water so that the concentration of the solution remains constant. When the overhead temperature is about 50° C. and the top product contains only water, the distillation is ended; the product is then adjusted with water to a weight of 2262 g.

To prepare a cold end coating composition, 2.5 parts by weight of the resulting solution are mixed with 1.5 parts by weight of a polyethylene dispersion bearing the commercial designation TECOL OG 25 from Trüb Chemie, Ramsen, Switzerland and 96 parts by weight of water. The mixture obtained can be employed directly.

In the text below, the process of the invention for the surface sealing of hollow articles is explained by way of example. In this explanation, the following abbreviations are used:

HV=prior art hot end coating with titanium tetrachloride

KV=prior art cold end coating with a mixture of 1.5 parts by weight of TECOL OG 25 from Trüb Chemie, Ramsen, Switzerland and 98.5 parts by weight of water, so far as not otherwise indicated MKV=modified cold end coating in accordance with the invention In all cases, the coating composition is applied via a spray bridge.

EXAMPLE 3

This example illustrates the treatment of a 0.33 ltr Standard III beer bottle, 25 both with and without hot end coating, with the silane-modified polyethylene dispersion of Example 1 at 80° C.

For the series of experiments, the internal pressure resistances of one mold batch were measured at the exit from the annealing lehr, at the packer, after 1, 5 and 10 minutes of the line simulator (wet) and compared with the internal pressure resistances of the bottle with the standard coating. Table 1 shows the measured internal pressure resistances with associated standard deviations.

For comparison, bottles were treated by hot end coating with a silane-modified polyethylene dispersion of the same composition as that of Example 1 but without a maturation period. The results are set out in Table 1 under the column HV/MKVoR.

The line simulator is used to simulate the strength properties in linear transport both within the glassworks and in the course of bottling. Here, effects acting on the bottle in the course of its use by friction, impact, pressure and moisture are simulated. One minute of the line simulator corresponds approximately to the life cycle of a single-trip bottle from the production process to the end user. 10 minutes of the line simulator correspond to approximately 10 to 12 circuits in the case of returnable bottles.

TABLE 1

|  | HV/KV | HV/MKV | HV/MKVoR | MKV |
|---|---|---|---|---|
| Annealing lehr |  |  |  |  |
| Mean [bar] | 34.78 | 33.86 | 34.16 | 36.48 |
| Standard deviation [bar] | 6.08 | 4.88 | 5.02 | 4.75 |
| Packer |  |  |  |  |
| Mean [bar] | 35.64 | 32.86 | 33.13 | 35.01 |
| Standard deviation [bar] | 7.83 | 9.77 | 9.10 | 5.54 |
| 1 min line simulator |  |  |  |  |
| Mean [bar] | 16.01 | 21.10 | 16.23 | 16.30 |
| Standard deviation [bar] | 2.02 | 5.33 | 1.95 | 1.90 |
| 5 min line simulator |  |  |  |  |
| Mean bar | 12.50 | 18.40 | 12.20 | 12.21 |
| Standard deviation [bar] | 0.85 | 2.57 | 0.93 | 1.34 |
| 10 min line simulator |  |  |  |  |
| Mean [bar] | 10.62 | 14.22 | 10.57 | 10.70 |
| Standard deviation [bar] | 0.75 | 1.48 | 0.79 | 0.80 |

HV: Hot end coating
KV: Cold end coating
MKV: Modified cold end coating
MKVoR: Modified cold end coating without maturation period The results both here and in the following examples show that in the process of the invention for surface sealing (MKV) it is possible to do without hot end coating; the resulting internal pressure resistance is then at the same level as in the case of the customary prior art combination of hot end coating and cold end coating (HV/KV). The omission of hot end coating brings advantages in terms of costs, ecology and production freedom. When there are high requirements on the internal pressure resistance even in the case of prolonged usage, however, the combination of hot end coating and surface sealing in accordance with the invention (HV/MKV) is far superior to the prior art.

EXAMPLE 4

This example illustrates the treatment of 0.5 ltr NRW beer bottles, both with and without hot end coating, with the silane-modified polyethylene dispersion of Example 1 at 85° C. The procedure is exactly as in Example 3. Table 2 shows the measured internal pressure resistances with the associated standard deviations.

For comparison, bottles without hot end coating are treated with a silane-modified polyethylene dispersion of the same composition as that of Example 1 but without a maturation period. The results are set out in Table 2 under the column MKVoR.

TABLE 2

|  | HV/KV | HV/MKV | MKV | HV/MKVor |
|---|---|---|---|---|
| Annealing lehr |  |  |  |  |
| Mean [bar] | 44.61 | 45.25 | 45.53 | 44.16 |
| Standard deviation [bar] | 7.77 | 6.95 | 7.19 | 7.21 |
| Packer |  |  |  |  |
| Mean [bar] | 39.17 | 45.16 | 40.70 | 39.78 |
| Standard deviation [bar] | 7.08 | 8.03 | 6.88 | 7.01 |

TABLE 2-continued

|  | HV/KV | HV/MKV | MKV | HV/MKVor |
|---|---|---|---|---|
| 1 min line simulator | | | | |
| Mean [bar] | 22.84 | 36.87 | 35.58 | 23.84 |
| Standard deviation [bar] | 1.94 | 8.15 | 8.96 | 2.11 |
| 5 min line simulator | | | | |
| Mean bar | 20.39 | 29.60 | 26.36 | 19.27 |
| Standard deviation [bar] | 2.89 | 4.75 | 2.42 | 2.61 |
| 10 min line simulator | | | | |
| Mean [bar] | 18.86 | 29.30 | 24.37 | 17.86 |
| Standard deviation [bar] | 1.38 | 4.22 | 2.81 | 1.13 |

HV: Hot end coating
KV: Cold end coating
MKV: Modified cold end coating
MKVoR: Modified cold end coating without maturation period

EXAMPLE 5

This example illustrates the treatment of a 0.7 ltr sparkling-wine bottle, both with and without hot end coating, with a silane-modified polyethylene dispersion which has been prepared in accordance with Example 1 and contains 2% by weight of polyethylene dispersion and 0.5% by weight of 3-aminopropyltriethoxysilane, at 91° C. The procedure is otherwise exactly as in Example 3. Table 3 shows the measured internal pressure resistances with the associated standard deviations.

TABLE 3

|  | HV/KV | HV/MKV | MKV |
|---|---|---|---|
| Annealing lehr | | | |
| Mean [bar] | 41.34 | 41.97 | 41.24 |
| Standard deviation [bar] | 2.95 | 0.16 | 2.09 |
| Packer | | | |
| Mean [bar] | 40.16 | 41.23 | 39.32 |
| Standard deviation [bar) | 5.15 | 2.89 | 5.72 |
| 1 min line simulator | | | |
| Mean [bar] | 33.72 | 39.08 | 30.37 |
| Standard deviation [bar] | 6.30 | 3.82 | 5.73 |
| 5 min line simulator | | | |
| Mean [bar] | 26.67 | 38.33 | 21.05 |
| Standard deviation [bar] | 3.44 | 4.78 | 2.35 |
| 10 min line simulator | | | |
| Mean [bar) | 20.06 | 31.36 | 19.63 |
| Standard deviation [bar] | 3.25 | 4.48 | 1.80 |

HV: Hot end coating
KV: Cold end coating; 2% by weight
MKV: Modified cold end coating

EXAMPLE 6

This example illustrates the treatment of a hot end coated 1 ltr soft drinks bottle with the same silane-modified polyethylene dispersion as used in Example 5, at 80° C. The procedure is otherwise exactly as in Example 3 and comparison is with the internal pressure resistances of bottles having received a standard coating with different, commercial cold end coating compositions. Table 4 shows the measured internal pressure resistances with the associated standard deviations.

TABLE 4

|  | HV/KV1 | HV/KV2 | HV/MKV |
|---|---|---|---|
| Annealing lehr | | | |
| Mean [bar] | 21.21 | 24.17 | 20.74 |
| Standard deviation [bar] | 6.36 | 5.52 | 5.36 |
| Packer | | | |
| Mean [bar] | 20.09 | 20.14 | 20.62 |
| Standard deviation [bar) | 4.27 | 5.61 | 4.81 |
| 1 min line simulator | | | |
| Mean [bar] | 17.84 | 17.73 | 18.82 |
| Standard deviation [bar] | 3.76 | 4.11 | 3.41 |
| 5 min line simulator | | | |
| Mean [bar] | 12.47 | 11.44 | 16.08 |
| Standard deviation [bar] | 1.64 | 1.05 | 2.06 |
| 10 min line simulator | | | |
| Mean [bar) | 11.02 | 10.24 | 15.09 |
| Standard deviation [bar] | 1.24 | 0.69 | 1.72 |

HV: Hot end coating
KV1: TEGOGLAS ® RP40 (Goldschmidt AG); 2% by weight
KV2: TEGOGLAS ® RP40 C (Goldschmidt AG); 2% by weight
MKV: Modified cold end coating

EXAMPLE 7

As in Example 4, 0.5 ltr NRW beer bottles, both with and without hot end coating, are treated with the silane-modified polyethylene dispersion of Example 1. For the series of experiments, in each case the wet and dry nick scratch properties of one mold batch are measured at the exit from the annealing lehr and compared with the corresponding values of the bottle with the standard coating. The scratch resistance values found are reproduced in Table 5.

TABLE 5

|  | HV/KV | HV/MKV | MKV |
|---|---|---|---|
| Nick scratch resistance [lbs] wet | 50 | 65 | 55 |
| Nick scratch resistance [lbs] dry | 60 | 75 | 70 |
| Slip angle [°] | 9.9 | 9.6 | 9.4 |

HV: Hot end coating
KV: Cold end coating
MKV: Modified cold end coating

EXAMPLE 8 a 98 parts by weight of water are added to 1.5 parts by weight of an ester wax dispersion bearing the commercial designation TEGOGLAS® R 200 (Gold-schmidt AG; 21.5% by weight solids content). Then 0.5 part by weight of 3-aminopropyltriethoxysilane is mixed in, after which the mixture is left to stand at room temperature for 6 hours. The mixture is then ready for use.

EXAMPLE 8 b 97.5 parts by weight of water are added to 2 parts by weight of a surfactant bearing the commercial designation TEGOGLAS® T 5 (Goldschmidt AG; 20% by weight solids content). Then 0.5 part by weight of 3-aminopropyltriethoxysilane is mixed in, after which the mixture is left to stand at room temperature for 6 hours. The mixture is then ready for use.

EXAMPLE 8 c 0.5 ltr NRW beer bottles without hot end coating are treated partly with the cold end coating composition from Example 1, partly with the cold end coating composition from Example 8 a and partly with the cold end coating composition from Example 8 b, the procedure followed being as in Example 4. Labelability is then investigated in terms of adhesion and detachment for casein and dextrin glues. Table 6 presents the results and shows that the silane-modified cold end coating compositions have no adverse effect on labelability.

TABLE 6

| Adhesion | Polyethylene/ silane | Ester wax/ silane | Surfactant/ silane |
|---|---|---|---|
| Dry | Fiber tearing[a)] Adhesion good | Fiber tearing[a)] Adhesion good | Fiber tearing[a)] Adhesion good |
| Wet (H$_2$O, 20° C.) | > 60 minutes Adhesion good[b)] | > 60 minutes Adhesion good[b)] | > 60 minutes Adhesion good[b)] |
| Wet (2% NaOH, 80° C.) | Up to 2 minutes Adhesion good[c)] | Up to 5 minutes Adhesion good[c)] | Up to 4 minutes Adhesion good[c)] |

[a)]in the course of the peel removal test
[b)]no signs of detachment up to the end of the measurement time (60 minutes)
[c)]subsequently, the label becomes detached and floats The same results are obtained with additionally hot end coated bottles of the same type and with 1 ltr soft drink bottles and 0.33 ltr standard III beer bottles (in each case with and without hot end coating).

EXAMPLE 9

This example illustrates the treatment of a hot end coated 0.33 ltr single-use beer bottle with the silane-modified polyethylene dispersion of Example 2 at 80° C. The procedure followed is exactly as in Example 3. Table 7 shows the internal pressure resistances with associated standard deviations.

TABLE 7

|  | HV/KV | HV/MKV |
|---|---|---|
| Annealing lehr |  |  |
| Mean [bar] | 42.73 | 39.66 |
| Standard deviation [bar] | 7.82 | 4.51 |
| Packer |  |  |
| Mean [bar] | 39.62 | 38.67 |
| Standard deviation [bar] | 5.67 | 6.96 |
| 1 min line simulator |  |  |
| Mean [bar] | 19.65 | 28.84 |
| Standard deviation [bar] | 2.80 | 4.95 |
| 5 min line simulator |  |  |
| Mean [bar] | 14.58 | 22.13 |
| Standard deviation [bar] | 1.65 | 2.37 |

HV: Hot end coating
KV: Cold end coating
MKV: Modified cold end coating

Example 10

1580 g of water (87.8 mol) are charged to a heatable stirred reactor (internal thermometer, metering apparatus via dip tube, distillation apparatus, connection to vacuum pump) and 540 g of 3-aminopropyltriethoxysilane (2.4 mol) are metered in slowly such that the temperature does not exceed 50° C. This reaction is slightly exothermic. The apparatus is then thermostated at 50° C. and stirring is continued for 6 hours. After this time, the silane has undergone complete hydrolysis to the corresponding silanol and has dissolved in the resulting EtOH/H$_2$O mixture. The hydrolysis alcohol is subsequently distilled off under a pressure of 100–70 mbar and a bottom temperature of max. 50° C.

When the overhead temperature is about 48° C. and the top product contains only H$_2$O, distillation is ended and the product is adjusted to a weight of 1980 g by adding H$_2$O.

A cold end coating composition is prepared by mixing 1.25 parts by weight of the resulting solution, 1.5 parts by weight of a polyethylene dispersion bearing the commercial designation TECOL OG 25 from Trüb Chemie, Ramsen, Switzerland and 97.25 parts by weight of water. The mixture obtained can be employed directly.

As in Example 4, hot end coated 0.5 ltr NRW beer bottles are treated with this mixture. Table 8 shows the internal pressure resistances found, with the associated standard deviations.

TABLE 8

|  | HV/KV | HV/MKV |
|---|---|---|
| Annealing lehr |  |  |
| Mean [bar] | 47.55 | 51.39 |
| Standard deviation [bar] | 10.14 | 8.60 |
| 1 min line simulator |  |  |
| Mean [bar] | 25.10 | 27.67 |
| Standard deviation [bar] | 2.92 | 2.74 |
| 5 min line simulator |  |  |
| Mean [bar] | 21.66 | 25.22 |
| Standard deviation [bar] | 2.25 | 2.42 |

HV: Hot end coating
KV: Cold end coating
MKV: Modified cold end coating

EXAMPLE 11

304.3 g of 3-aminopropyltriethoxysilane (1.376 mol) are charged together with 101.1 g of methyltriethoxysilane (0.568 mol) to a heatable stirred reactor (internal thermometer, metering apparatus via dip tube, distillation apparatus, connection to vacuum pump). Then 608.5 g of H$_2$O (33.8 mol) are metered in, the first 50 g very slowly (exothermic hydrolysis), such that a temperature of 50–55° C. is attained. At the end of the hydrolysis reaction the temperature falls; by adjusting the heating the temperature should be thermostated at 55° C. again as quickly as possible. Stirring is continued for 2 hours and then the EtOH formed is distilled off under a vacuum of 135 mbar. The bottom temperature during this distillation should not exceed 75° C. After taking off about 50 g of distillate, the mixture is supplemented with 50 g of H$_2$O. At a take-off of 100 g, a sample of the distillate is taken and is analyzed by GC. The amount of H$_2$O to be added is determined from the GC distribution of H$_2$O and EtOH and from the volume taken off. After each further taking of 100 g of distillate a sample is taken for analysis, the missing volume is supplemented with H$_2$O, and the amount of EtOH removed by distillation is calculated. The end of the distillation at a bottom temperature of 75° C. is also the end of the reaction [amounts taken off: about 265 g of EtOH (5.8 mol) and about 95 g of H$_2$O (5.3 mol); H$_2$O required for supplementing: about 350 g (19.4 mol)]. The bottom product which remains is adjusted by further addition of H$_2$O to the mass originally present prior to distillation.

Cold end coating compositions in accordance with the claims are prepared from this solution together with polyethylene. When bottles are coated with these compositions, the same advantageous effects are achieved as in the previous examples.

EXAMPLE 12

708 g of 3-glycidyloxypropyltrimethoxysilane (3.0 mol) are charged to a heatable stirred reactor (internal thermometer, metering apparatus via dip tube, distillation apparatus, connection to vacuum pump). 162 g of $H_2O$ (9.0 mol; 3.0 mol/mol of 3-glycidyloxypropyltrimethoxysilane) and 3.5 g of HCOOH (85% strength) are mixed and the mixture is added over the course of 20 minutes. During this time the temperature rises from 20° C. to 35° C. The reaction mixture is stirred at 60° C. for 2 hours. Then the hydrolysis alcohol is distilled off under a pressure of 300–133 mbar and at a bottom temperature of 40–50° C. and is replaced by $H_2O$ [about 500 g (27.8 mol)]. When the overhead temperature is about 50° C and the top product contains only $H_2O$, distillation is ended and the product is adjusted with $H_2O$ [about 825 g (45.8 mol)] to a weight of 1770 g.

Cold end coating compositions in accordance with the claims are prepared from this solution together with polyethylene. When bottles are coated with these compositions, the same advantageous effects are achieved as in the previous examples.

What is claimed is:

1. A process for producing surface-sealed hollow glass containers, where as part of the production process the hollow glass containers are coated with a water-based cold end coating composition in the region of the exit from the annealing lehr, which is arranged following a machine for producing hollow glass containers, wherein the cold end coating composition comprises the following components:

I. a water-based organopolysiloxane-containing composition prepared from
   a) Q moles of functional group-bearing alkoxysilanes of the general formula $$A\text{—}Si(R^1)_y(OR^*)_{3-y} \quad\quad I$$

and
   b) M moles of alkoxysilanes selected from
      α) trialkoxysilanes of the general formula $$R^2\text{—}Si(OR^{**})_3 \quad\quad II$$

and/or
      β) dialkoxysilanes of the general formula $$R^3R^4Si(OR^{***})_2 \quad\quad III$$

and/or
      γ) tetraalkoxysilanes of the general formula $$Si(OR^{****})_4 \quad\quad IV,$$

where
   A is a substituent possessing at least one amino, alkylamino, dialkylamino, amido, epoxy, acryloxy, methacryloxy, cyano, isocyanato, ureido, thiocyanato, mercapto, sulfane or halogen group which is attached directly or via an aliphatic or aromatic hydrocarbon radical to silicon,
   $R^1$=methyl, ethyl or A (as defined above),
   y=0 or 1,
   $R^*$, $R^{}$, $R^{*}$ and $R^{****}$ independently of one another are an alkyl group having 1 to 8 carbon atoms or a corresponding alkyl group that is substituted by an alkyl((poly)ethylene glycol)) radical,
   $R^2$, $R^3$ and $R^4$ independently of one another are an alkyl, alkenyl, alkynyl, cycloalkyl, cycloalkenyl or aromatic group having in each case not more than 18 carbon atoms, or a group of this kind which is partially fluorinated, perfluorinated and/or substituted by alkyloxy and/or by aryloxy groups, in a molar ratio $0 \leq M/Q \leq 20$, and II. a silicon-free component selected from
   a) a wax and/or
   b) a partial fatty acid ester and/or
   c) a fatty acid and/or
   d) a surfactant;
   wherein the water-based cold end coating composition is an aqueous system and has a dry-matter content of from 0.1 to 10% by weight and, based on dry matter, the weight ratio of the organopolysiloxane-containing composition (component I) to the silicon-free component II is from 0.05:1 to 20:1.

2. The process as claimed in claim 1, wherein in the mixture of the silanes I to IV there are on average per silicon atom at least 2.4 alkoxy groups $OR^*$, $OR^{}$, $OR^{*}$ and/or $OR^{****}$.

3. The process as claimed in claim 1, wherein the water-based organopolysiloxane-containing composition is prepared by mixing the silane composition in accordance with the general formulae I to IV with water and leaving the mixture to stand at room temperature for at least 3 hours.

4. The process as claimed in claim 1, wherein the water-based organopolysiloxane-containing composition is prepared by adding from 0.5 to 30 mol of water per mole of the alkoxysilanes employed to the silane composition in accordance with the general formulae I to IV and removing by distillation the alcohol hat is formed in the course of the reaction.

5. The process as claimed in claim 1, wherein the ratio of the alkoxysilanes of the formulae II to IV to the functional alkoxysilanes of the formula I is $0 \leq M/Q \leq 12$.

6. The process as claimed in claim 1, wherein the ratio of the alkoxysilanes of the formulae II to IV to the functional alkoxysilanes of the formula I is $0.02 \leq M/Q \leq 7$.

7. The process as claimed in claim 1, wherein the ratio of the alkoxysilanes of the formulae II to IV to the functional alkoxysilanes of the formula I is $0.1 \leq M/Q \leq 4$.

8. The process as claimed in claim 1, wherein the surfaces of the freshly produced hollow glass containers have been provided with a hot end coating.

9. The process as claimed in claim 1, wherein the wax is employed in the form of an aqueous dispersion.

10. The process as claimed in claim 1, wherein the coating composition used contains up to 10% by weight of organic cosolvents.

11. The process as claimed in claim 1, wherein the coating composition used is an aqueous system having a dry-matter content of from 0.1 to 8% by weight.

12. The process as claimed in claim 11, wherein the dry-matter content is from 0.2 to 5% by weight.

13. The process as claimed in claim 11, wherein the dry-matter content is from 0.5 to 3% by weight.

14. The process as claimed in claim 1, wherein, based on dry matter, the weight ratio of the organopolysiloxane-containing composition I to the silicon-free component II is from 0.05:1 to 5:1.

15. The process as claimed in claim 14, wherein the weight ratio is from 0.1:1 to 2:1.

16. The process as claimed in claim 1, wherein the content of the organopolysiloxane-containing composition in the coating composition is not more than 5% by weight.

17. The process as claimed in claim 1, wherein the content of the organopolysiloxane-containing composition in the coating composition is from 0.03 to 2% by weight.

18. The process as claimed in claim 1, wherein the content of the organopolysiloxane-containing composition in the coating composition is from 0.05 to 1% by weight.

19. The process as claimed in claim 1, wherein the content of the organopolysiloxane-containing composition in the coating composition is from 0.1 to less than 1% by weight.

20. The process as claimed in claim 1, wherein a further coat of a known cold end coating composition is additionally applied.

21. The process as claimed in claim 1, wherein the temperature of the glass surface when the cold end coating composition is applied is in the range from 30 to 150° C.

22. The process as claimed in claim 21, wherein the temperature of the glass surface is in the range from 70 to 110° C.

23. A hollow glass container produced as claimed in claim 1.

* * * * *

UNITED STATES PATENT AND TRADEMARK OFFICE
CERTIFICATE OF CORRECTION

PATENT NO. : 6,363,749 B1
DATED : April 2, 2002
INVENTOR(S) : Jenkner et al.

Page 1 of 1

It is certified that error appears in the above-identified patent and that said Letters Patent is hereby corrected as shown below:

Title page,
Item [30], the Foreign Application Priority Data should read as follows:

-- [30]   Foreign Application Priority Data
Apr. 4, 1997     (DE) .................. 197 14 020
Mar. 4, 1998    (DE) .................. 198 09 057 --

Signed and Sealed this

Seventeenth Day of September, 2002

*Attest:*

*Attesting Officer*

JAMES E. ROGAN
*Director of the United States Patent and Trademark Office*